(12) United States Patent
Soeda (10) Patent No.: US 7,434,655 B2
(45) Date of Patent: Oct. 14, 2008

(54) POWER STEERING SYSTEM (75) Inventor: Jun Soeda, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 443 days.

(21) Appl. No.: 11/220,544

(22) Filed: Sep. 8, 2005

(65) Prior Publication Data
US 2006/0070792 A1 Apr. 6, 2006

(30) Foreign Application Priority Data
Sep. 10, 2004 (JP) ............................ 2004-264575

(51) Int. Cl.
B62D 5/06 (2006.01)
(52) U.S. Cl. ...................... 180/441; 180/422
(58) Field of Classification Search ............... 180/422, 180/421, 441, 442; 137/315.03; 60/384
See application file for complete search history.

(56) References Cited

U.S. PATENT DOCUMENTS

| | | | |
|---|---|---|---|
| 6,193,009 B1 * | 2/2001 | Chino et al. | 180/441 |
| 6,523,913 B1 * | 2/2003 | Lauer et al. | 303/119.2 |
| 6,568,499 B2 * | 5/2003 | Nakazawa et al. | 180/422 |
| 6,742,537 B2 * | 6/2004 | Martus et al. | 137/15.18 |
| 6,880,668 B2 * | 4/2005 | Sakaki et al. | 180/441 |
| 6,886,657 B2 * | 5/2005 | Yokota et al. | 180/422 |
| 6,945,510 B2 * | 9/2005 | Dralyuk | 251/129.15 |
| 6,953,102 B2 * | 10/2005 | Kurata et al. | 180/442 |
| 7,044,262 B2 * | 5/2006 | Otaki et al. | 180/422 |
| 7,174,988 B2 * | 2/2007 | Sasaki et al. | 180/422 |

FOREIGN PATENT DOCUMENTS

JP 2003-237601 A 8/2003

* cited by examiner

Primary Examiner—Tony H. Winner
(74) Attorney, Agent, or Firm—Foley & Lardner LLP (57) ABSTRACT A power steering system includes first and second communication passages for providing communication between a first oil passage and a second oil passage, a third communication passage for providing communication between the first and second communication passages, a directional control valve disposed in the third communication passage, a first check valve disposed in the first communication passage for allowing flow from the first oil passage to a first connection portion only, a second check valve disposed in the first communication passage for allowing flow from second oil passage to the first connection portion only, a third check valve disposed in the second communication passage for allowing flow from a second connection portion to the first oil passage only, and a fourth check valve disposed in the second communication passage for allowing flow from the second connection portion to the second oil passage only.

16 Claims, 4 Drawing Sheets

POWER STEERING SYSTEM

BACKGROUND OF THE INVENTION

The present invention relates to a power steering system of the kind in which an oil pump is driven by an electric motor for producing a steering assist force.

In a power steering system of the kind disclosed in Unexamined Japanese Patent Publication No. 2003-237601, in case a hydraulic circuit is locked due to, for example, stoppage of an oil pump, movement of a piston of a power cylinder in response to a steering operation of a driver causes working oil in one of oil pressure chambers of the power cylinder to be pressurized and returned to a reservoir. Further, a negative pressure is developed in the other of the oil pressure chambers due to expansion thereof, thus causing the other of the oil pressure chambers to draw working oil from the reservoir.

SUMMARY OF THE INVENTION

However, in the above-described prior art technology, in case the flow resistance of working oil is large such as at the time of low temperature, drawing of working oil from the reservoir cannot follow the steering operation of the driver, thus causing a problem that the steering load on the driver becomes excessively large.

It is accordingly an object of the present invention to provide a power steering system that can retain a good followability of working oil to a steering operation of a driver and thereby decrease a steering load on the driver even when the flow resistance of working oil is large such as at the time of low temperature.

To achieve the above object, the present invention provides a power steering system comprising a power cylinder for applying a steering assist force to a steering mechanism, the power cylinder having a piston and first and second oil pressure chambers divided by the piston, a reversible pump having a pair of discharge ports, a first oil passage connecting the first oil pressure chamber to one of the discharge ports, a second oil passage connecting the second oil pressure chamber to the other of the discharge ports, an electric motor for driving the reversible pump in forward and reverse directions, a steering assist force detector for detecting a steering assist force to be applied to the steering mechanism, an electric motor control circuit for outputting to the electric motor a drive signal that causes the reversible pump to produce a desired oil pressure on the basis of the steering assist force, a first communication passage interconnecting the first oil passage and the second oil passage, a second communication passage interconnecting the first oil passage and the second oil passage, a third communication passage interconnecting the first communication passage and the second communication passage, an electromagnetic directional control valve disposed in the third communication passage to open and close the third communication passage, a first check valve disposed in the first communication passage at a location between a first connection portion and the first oil passage for allowing working oil to flow in one direction from the first oil passage to the first connection portion only, the first connection portion being a portion at which the first communication passage and the third communication passage are connected, a second check valve disposed in the first communication passage at a location between the first connection portion and the second oil passage for allowing working oil to flow in one direction from second oil passage to the first connection portion only, a third check valve disposed in the second communication passage at a location between a second connection portion and the first oil passage for allowing working oil to flow in one direction from the second connection portion to the first oil passage only, the second connection portion being a portion at which the second communication passage and the third communication passage are connected, and a fourth check valve disposed in the second communication passage at a location between the second connection portion and the second oil passage for allowing working oil to flow in one direction from the second connection portion to the second oil passage only.

The other objects and features of this invention will become understood from the following description with reference to the accompanying drawings.

DESCRIPTION OF THE PREFERRED EMBODIMENT

Referring to FIGS. 1 to 4, inclusive, a power steering system according to an embodiment of the present invention will be described.

[Structure of Power Steering System]

Figure 1:
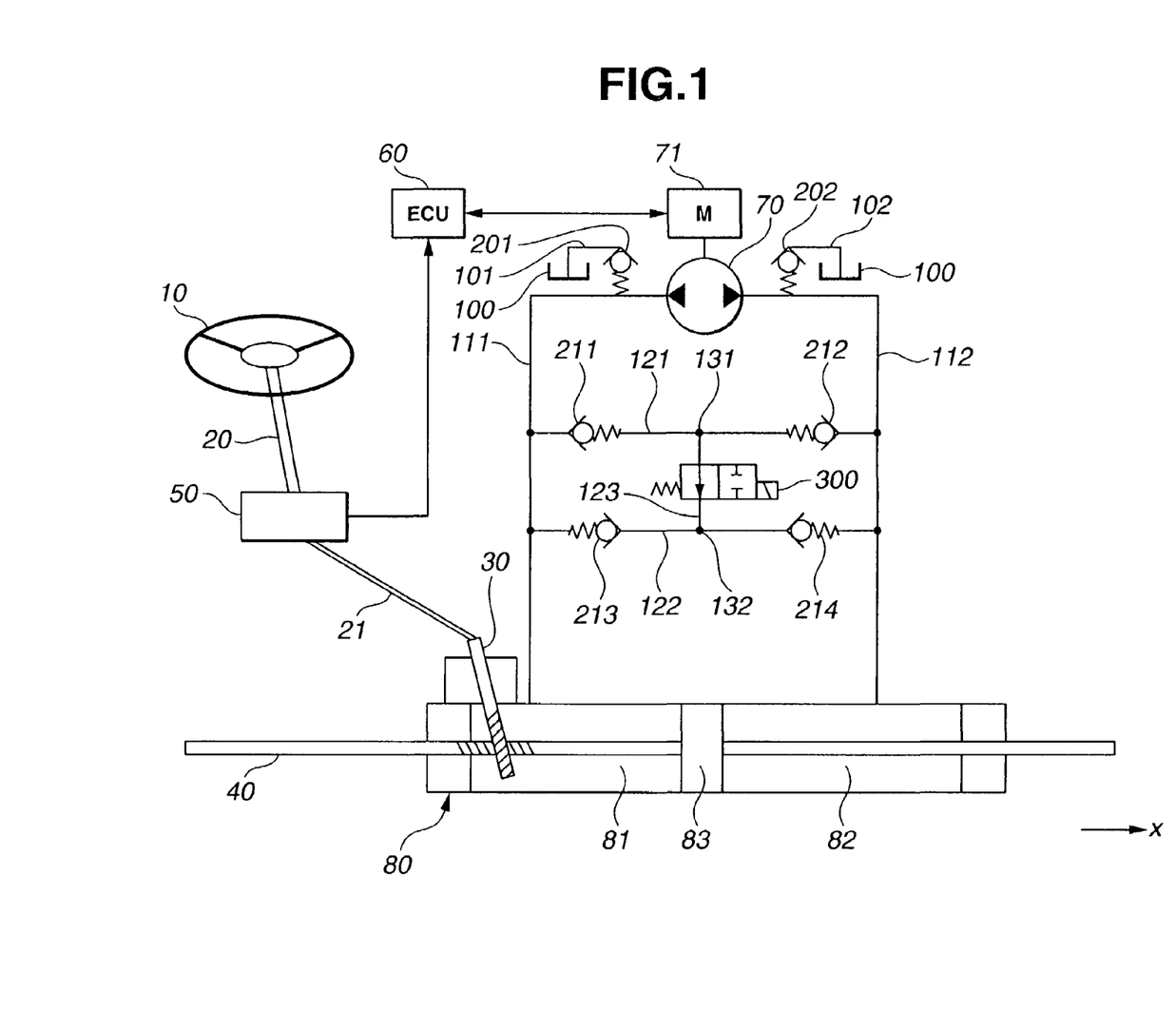
FIG. 1 is a schematic view of a power steering system according to an embodiment of the present invention.

Referring first to FIG. 1, when a driver operates a steering wheel 10 of a steering mechanism, a pinion shaft 30 is driven by way of a steering shaft 20 and a steering column 21, thus causing a rack shaft 40 to be driven to move axially by means of a so-called rack and pinion mechanism, thereby causing front wheels (not shown) to be steered. Steering shaft 20 is provided with a torque sensor 50 as part of a steering assist force detector in the claims, that detects a steering torque applied to steering shaft 20 by a driver and outputs a torque signal representative of a detected steering torque to an electronic control unit (ECU) 60.

Rack shaft 40 is provided with a power steering mechanism for assisting movement of rack shaft 40 in accordance with a steering torque applied to steering shaft 20 by a driver. The power steering mechanism includes a reversible pump 70 driven by an electric motor 71 and a hydraulic power cylinder 80 for moving rack shaft 40 in the left-hand and right-hand directions in the drawing, i.e., axially thereof. Reversible pump 70 has a pair of discharge ports (no numeral) Power cylinder 80 includes a piston 83 axially movably disposed within a cylinder section to divide the interior of the cylinder section into first and second oil pressure chambers 81, 82.

First oil pressure chamber 81 is connected to one of the discharge ports of reversible pump 70 by way of a first oil passage 111. Second oil pressure chamber 82 is connected to the other of the discharge ports of reversible pump 70 by way of a second oil passage 112. First and second oil passages 111, 112 are connected to a reservoir 100 by way of first and second suction passages 101, 102, respectively. Check valves 201, 202 are disposed in first and second suction passages 101, 102, respectively.

Check valves 201, 202 prevent working oil from flowing reversely toward reservoir 100 while allowing working oil to be supplied from reservoir 100 to first and second oil passages 101, 102 when working oil in first and second oil passages 101, 102 is insufficient.

First and second oil passages 111, 112 are connected by first and second communication passages 121, 122, without passing through pump 70. First and second communication passages 121, 122 are connected at respective first and second connection portions 131, 132 by a third communication passage 123. Third communication passage 123 is provided with a normally open electromagnetic directional control valve 300 so as to provide or obstruct communication between first and second communication passages 121, 122.

First and second check valves 211, 212 are disposed in first oil passage 121 so as to be positioned between first connection portion 131 and first oil passage 111 and between first connection portion 131 and second oil passage 112, respectively. First check valve 211 allows working oil to flow in one direction from first oil passage 111 to first connection portion 131 only. Second check valve 212 allows working oil to flow in one direction from second oil passage 112 to first connection portion 131 only.

Third and fourth check valves 213, 214 are disposed in second communication passage 122 so as to be positioned between second connection portion 132 and first oil passage 111 and between second connection portion 132 and second oil passage 112, respectively. Third check valve 213 allows working oil to flow in one direction from second connection portion 132 to first oil passage 111 only. Fourth check valve 214 allows working oil to flow in one direction from second connection portion 132 to second oil passage 112 only.

To control unit 60 are inputted, in addition to a torque signal from torque sensor 50, a switch signal from an ignition switch, an engine speed signal from an engine speed sensor, a vehicle speed signal from a vehicle speed sensor, etc. Based on those signals, control unit 60 that also serves as an electric motor control circuit in the claims, determines a steering assist force and outputs instruction signals to electric motor 71 and electromagnetic directional control valve 300. In this connection, torque sensor 50 and control unit 60 constitute a steering assist force detector for detecting a steering assist force to be applied to the steering mechanism.

[Detail of Electromagnetic Directional Control Valve]

Figure 2:
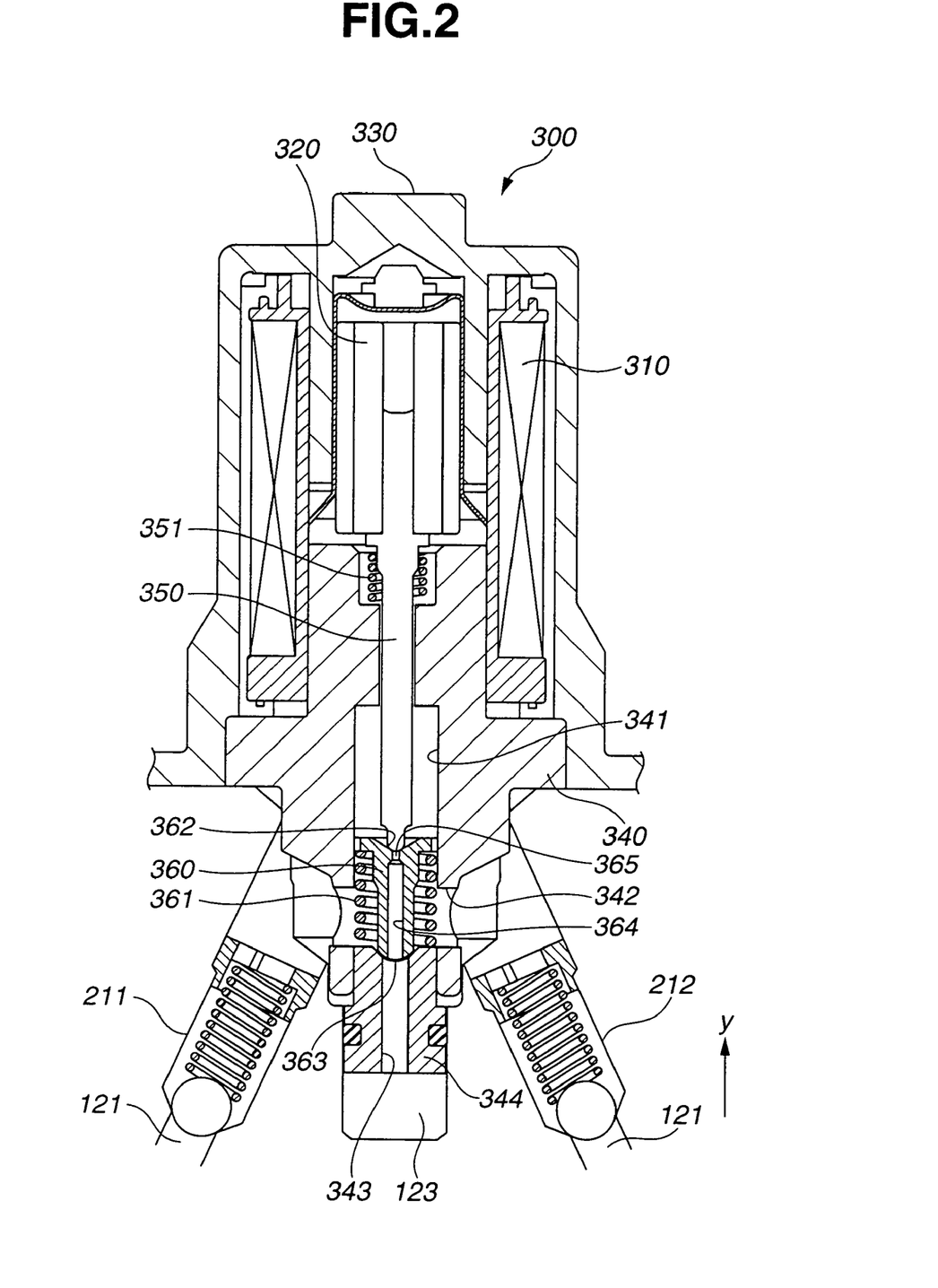
FIG. 2 is an enlarged sectional view of an electromagnetic directional control valve.

Electromagnetic directional control valve 300 is a poppet type valve and includes a solenoid housing 330 and a valve housing 340 fittingly joined with solenoid housing 330 and disposed in a hydraulic circuit of the power steering system. Solenoid housing 330 accommodates therewithin a solenoid 310 that produces an electromagnetic force on the basis of a signal from control unit 60 and an armature 320 that is drawn in the y-axis negative direction. The poppet type valve has a less likelihood of a foreign matter such as contaminant being held between valve members as compared with the spool type valve. Further, even if a foreign matter is held between the valve members, it never causes the poppet type valve to be clogged in a valve closed position. Electromagnetic directional control valve 300 is therefore structured to be a poppet type valve for attaining the safety.

Valve housing 340 has an axial through hole 341 within which a first poppet valve member 350 and a second poppet valve member 360 are axially movably disposed. Within axial through hole 341 are further disposed a first spring 351 for urging first poppet valve member 350 upward, i.e., in the y-axis positive direction and a second spring 361 for urging second poppet valve member 360 upward, i.e., in the y-axis positive direction.

Further, valve housing 340 has first and third communication ports 342, 343 which are communicated with first and third communication passages 121, 123, respectively. At a y-axis negative direction end of axial through hole 341, valve housing 340 has a seat 344 for abuttingly engagement with second poppet valve member 360 and formed with third communication port 343. Second poppet valve member 360 has at a y-axis positive direction end thereof a seat portion 362 for abutting engagement with first poppet valve member 350. Seat portion 362 serves as a first pressure receiving portion at which second poppet valve member 360 receives an oil pressure present in first communication passage 121. Second poppet valve member 360 further has a second pressure receiving portion 363 and an axial through hole 364 with a restricted hole section 365 that is smaller in diameter than a remaining part of through hole 364. Second poppet valve member 360 receives at second pressure receiving portion 363 an oil pressure present in third communication passage 123.

When electromagnetic directional control valve 300 is energized, armature 320 is drawn in the y-axis negative direction by an electromagnetic force of solenoid 310. This causes first poppet valve member 350 to move in the y-axis negative direction against the bias of first spring 351. First poppet valve member 350 is abuttingly engaged with seat portion 362 of second poppet valve member 360 and closes through hole 364. Second poppet valve member 360 is moved in the y-axis negative direction against the bias of second spring 361 together with first poppet valve member 350. Second poppet valve member 360 is abuttingly engaged with seat 344 and thereby obstruct communication between first and third communication passages 121, 123.

Since first and second check valves 211, 212 are disposed in first communication passage 121 so as to be located on the opposite sides of electromagnetic directional control valve 300, a predetermined oil pressure caused by a usual steering assisting operation is maintained in a passage portion between first and second check valves 211, 212 when second poppet valve member 360 is in a closed condition.

Such an oil pressure acts on second poppet valve member 360 in the direction to close the same, i.e., in the y-axis negative direction. Namely, by a pressure differential between first and third communication passages 121, 123, second poppet valve member 360 is urged in the y-axis negative direction. More specifically, since axial through hole 364 of second poppet valve member 360 has restricted hole section 365, such an axial force Fp2 that is calculated by the following expression acts on second poppet valve member 360.

$$Fp2 = P \times (As2 - As1)$$

where P is a pressure differential between first and third communication passages 121, 123, As1 is an effective cross sectional area of restricted hole section 365 and As1 is an effective cross sectional area of a portion of axial through hole 364 except for restricted hole section 365.

In this connection, since first poppet valve member 350 is seated on seat portion 362 of second poppet valve member 360, such an axial force Fp1 that is calculated by the following expression acts on first poppet valve member 350.

$$Fp1 = P \times As1$$

Accordingly, axial through hole 364 is effective for improving the sealing ability of electromagnetic directional control valve 300 and decreasing the power consumption.

Further, second pressure receiving portion 363 is smaller in area than first pressure receiving portion 362. Second poppet valve member 360 thus receives at first pressure receiving portion 362 a larger axial force than that at second pressure receiving portion 363 even when the oil pressures in first and third communication passages 121, 123 are the same. Accordingly, second poppet valve member 360 is further urged in the y-axis negative direction to improve the sealing ability.

When electromagnetic directional control valve 300 is de-energized, first poppet valve member 350 is moved in the y-axis positive direction under the bias of first spring 351 and opens through hole 364 of second poppet valve member 360. Second poppet valve member 360 is held in a closed condition, i.e., in a condition of being seated on seat 344 for a while by the effect of axial force Fp2. Thereafter, second poppet valve member 360 is moved in the y-axis positive direction under the bias of spring 361, thus causing first and third communication passages 121, 123 to be communicated with each other. In this instance, restricted hole section 365 of axial through hole 364 can produce an orifice effect and can prevent a sudden variation of oil pressure in the hydraulic circuit of the power steering system. In this manner, for fail-safe at the time of malfunction or abnormality in the power steering system, electromagnetic directional control valve 300 is de-energized and put into an open condition.

First and second poppet valve members 350, 360 are put into a closed condition when solenoid 310 is energized and into an open condition when solenoid 310 is de-energized. Thus, at the time of malfunction or abnormality in the power source, electromagnetic directional control valve 300 is put into an open condition to enable the driver to perform manual steering (i.e., steering without a steering assist force). Further, at the time of usual assisted steering, the above-described predetermined oil pressure in the oil passage between first and second check valves 211, 212 acts on second poppet valve member 360 in the direction to close the same. By such an oil pressure, the electric power consumed by solenoid 310 for making first and second poppet valve members 350, 360 close can be decreased.

[Flow of Working Oil within Power Steering System]
(At the time of Assisted Steering)

Figure 3:
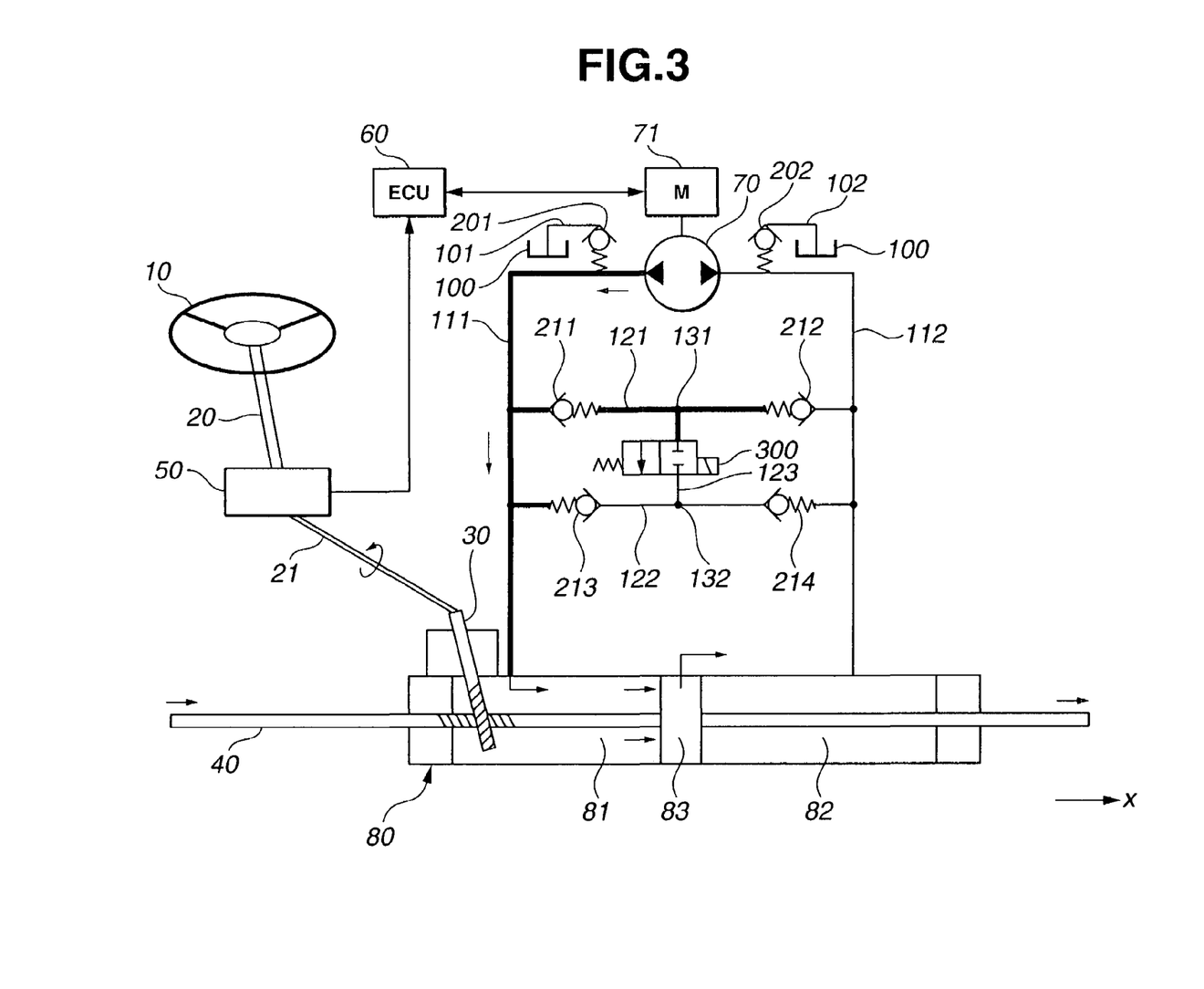
FIG. 3 is a view similar to FIG. 1 and shows a flow of working oil at the time of assisted steering.

FIG. 3 shows a flow of working oil within a power steering system at the time of assisted steering (i.e., steering assisted by a steering assist force).

When steering wheel 10 is steered by a driver, a steering torque is detected by torque sensor 50 by way of steering shaft 20. Based on the detected steering torque, control unit 60 determines a steering assist force in consideration of an ignition signal, engine speed, vehicle speed, etc. Electric motor 71 is driven on the basis of the determined steering assist force and actuates reversible pump 70.

In the meantime, description will be made to the case in which the pressure in first oil pressure chamber 81 is increased. Since the hydraulic circuit of the power steering system of this invention is symmetrical with respect to a predetermined axis, description with respect to increase in the pressure of second oil pressure chamber 82 will be omitted for brevity.

Working oil pumped up by reversible pump 70 from second oil pressure chamber 82 is introduced into first oil passage 111 and then into first oil pressure chamber 81 while being caused to act on first and third check valves 211, 213. An insufficient amount of working oil is supplied from reservoir 100. In this instance, since third check valve 213 does not allow flow of working oil from first oil passage 111 to second connection portion 132, working oil is not introduced into second oil passage 112 by way of second communication passage 122.

On the other hand, since first check valve 211 allows flow of working oil from first oil passage 111 to first connection portion 131, working oil flows through first check valve 211 and acts on second check valve 211 and electromagnetic directional control valve 300. In this instance, since electromagnetic directional control valve 300 is closed and second check valve 212 does not allow flow of working oil from first connection portion 131 to second oil passage 112, working oil is not introduced into second connection potion 132 and second oil passage 112 by way of first communication passage 121.

Accordingly, working oil pressurized by reversible pump 70 is shut off or blocked by second and third check valves 212, 213 and electromagnetic directional control valve 300, thus being prevented from flowing from first oil passage 112 to second oil passage 112 but causing all of working oil to be introduced into first oil pressure chamber 81. By this, first oil pressure chamber 81 is increased in pressure, thus causing piston 83 to move in the x-axis positive direction to produce a steering assist force.

In case second oil pressure chamber 82 is increased in pressure, pump pressure is shut off or blocked by first and fourth check valves 211, 214 and electromagnetic valve 300, thus being prevented from flowing in the direction from second oil passage 112 to first oil passage 111 but causing all working oil to be supplied to second oil pressure chamber 81 to increase the pressure in the same.

(At the time of Manual Steering)

Figure 4:
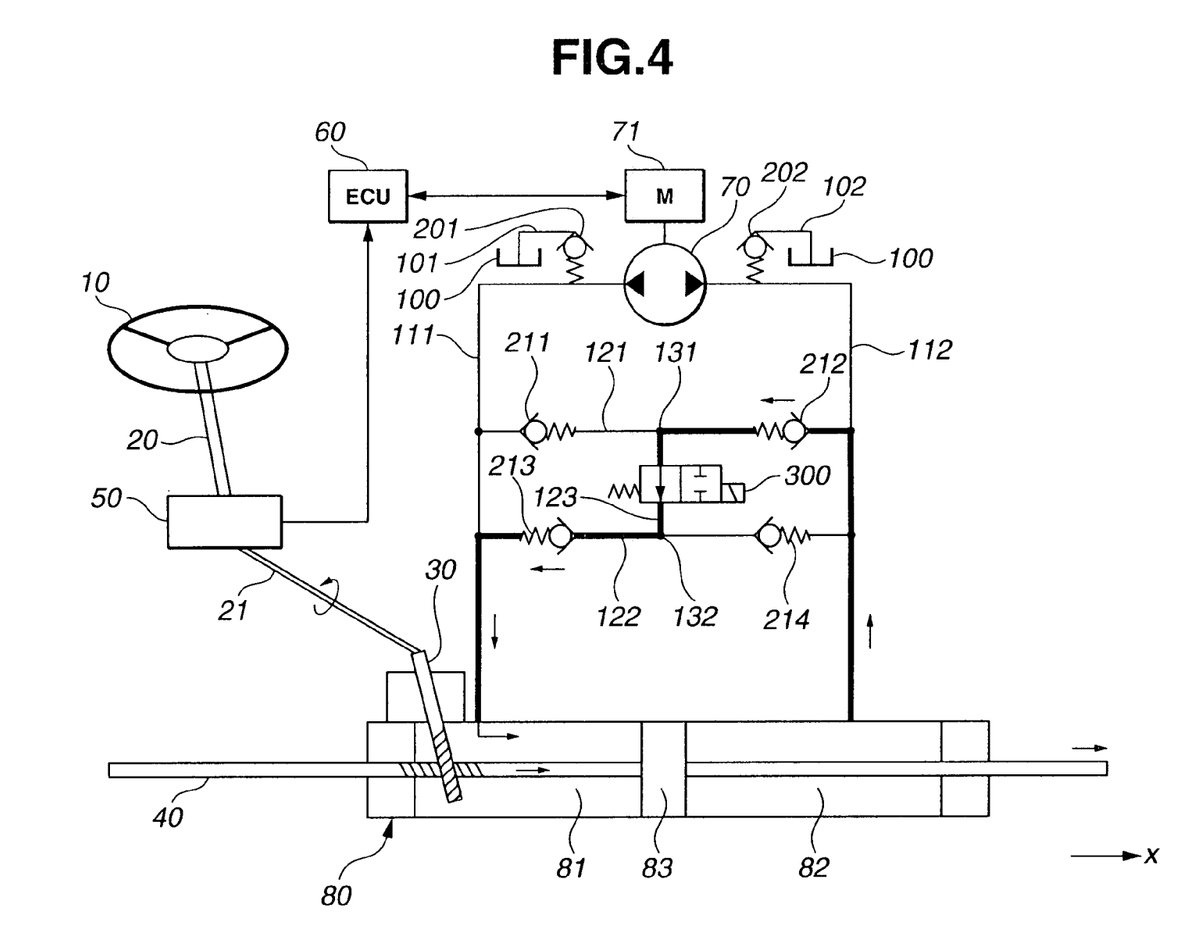
FIG. 4 is a view similar to FIG. 1 and shows a flow of working oil at the time of manual steering.

FIG. 4 shows flow of working oil within the power steering system at the time of manual steering (i.e., steering without any steering assist force). In case a steering assist force is not added to the steering mechanism due to malfunction of reversible pump 70 or electric motor 71, a failure of an electrical system or the like, the vehicle is steered by only a steering force provided by the driver, i.e., a manual steering is performed. In the meantime, description will be hereinafter made as to the case where rack shaft 40 is moved in the x-axis positive direction.

When a driver applies a steering force to steering wheel 10, a steering force is transmitted to rack shaft 40 by way of steering shaft 20 and pinion shaft 30, so that rack shaft 40 starts moving in the x-axis positive direction. With this, piston 83 is moved together with rack shaft 40, subjecting first and second oil pressure chambers 81, 82 to such forces that cause first oil pressure chamber 81 to increase in volume and second oil pressure chamber 82 to decrease in volume. Since it is the time when the vehicle is steered by manual steering, there is not produced any steering assist force by reversible pump 70.

In this instance, since first and second oil pressure chambers 81, 82 are filled with working oil, second oil pressure chamber 82 is pressurized in accordance with decrease in volume. Second oil passage 112 communicated with second oil pressure chamber 82 thus tends to be pressurized, causing pressurized working oil to act on second and fourth check valves 212, 214.

When this is the case, fourth check valve 214 does not allow flow of working oil from second oil passage 112 to second connection portion 132 and reversible pump 70 is sealed. Thus, it is impossible to introduce all of the working oil pressurized in second oil pressure chamber 82 into first oil pressure chamber 81 only by leakage. Accordingly, the working oil pressurized in second oil pressure chamber 82 is introduced into electromagnetic directional control valve 300 by way of second oil passage 112 and second check valve 212 that allows flow of working oil toward electromagnetic directional control valve 300.

Electromagnetic directional control valve 300 is a normally open valve and is opened at the time of failure or abnormality. For this reason, at the time of manual steering, at which steering assisting by reversible pump 70 cannot be expected, electromagnetic directional control valve 300 is always opened, thus allowing working oil introduced from second check valve 212 to pass through electromagnetic directional control valve 300 and act on third check valve 213. Further, since third check valve 213 allows working oil to flow from second connection portion 132 to first oil passage 111, the working oil is introduced through third check valve 213 to first oil passage 111.

Accordingly, in case of introducing working oil from first oil passage 111 to second oil passage 112, such introduction can be attained through first check valve 211, first connection portion 131, electromagnetic directional control valve 300, second connection portion 132 and fourth check valve 214. On the other hand, in case of introducing working oil from second oil passage 112 to first oil passage 111, such introduction can be attained through second check valve 212, first connection portion 131, electromagnetic directional control valve 300, second connection portion 132 and third check valve 213.

By this, the working oil pressurized in second oil pressure chamber 82 is supplied to first oil pressure chamber 81 without being subjected to an excessively large flow resistance, thereby attaining movement of working oil between oil pressure chambers 81, 82 without causing first oil pressure chamber 81 to tend to develop negative pressure therewithin. Further, it is least necessitated to get supply of the working oil in reservoir 100 in order that movement of the working oil between first and second oil pressure chambers 81, 82 can be smooth. Accordingly, it becomes possible to avoid or eliminate such a possibility that supply of working oil from reservoir 100 cannot follow the steering operation of the driver.

As having been described as above, at the time of manual steering, it becomes possible to attain smooth flow of working oil between first and second oil pressure chambers 81, 82 even when the flow resistance of the working oil is large, as at the time of cold temperature, thus making it possible to improve the followability of working oil to the steering operation of the driver and attain movement of rack shaft 40 in the x-axis positive direction without putting an excessively large steering load on the driver.

In the meantime, since the hydraulic circuit of the power steering system of this invention is configured symmetrically with respect to a predetermined axis, in case rack shaft 40 is moved in the x-axis negative direction at the time of manual steering, the working oil pressurized in first oil pressure chamber 81 is introduced through first oil passage 111, first check valve 211, electromagnetic directional control valve 300 and fourth check valve 214 into second oil passage 112 and then supplied to second oil pressure chamber 82 to attain movement of rack shaft 40 in the x-axis negative direction.

[Comparison between the embodiment and the prior art example with respect to effect produced thereby]

In a prior art power steering system, in case, for example, an oil pump is stopped to lock a hydraulic circuit, movement of a piston in a power cylinder in response to a steering operation of a driver causes working oil in one of oil pressure chambers of the power cylinder to be pressurized and returned to a reservoir while creating a vacuum or negative pressure in the other of the oil pressure chambers to draw working oil from the reservoir. However, the above-described prior art example has such a problem that, in case the flow resistance is large, as at the time of cold temperature, drawing of working oil from the reservoir cannot follow the steering operation of the driver so that the steering load on the driver is increased considerably.

In contrast to this, this embodiment includes first and second communication passages 121, 122 that interconnect first and second oil passages 111, 112, third communication passage 123 interconnecting first and second communication passages 121, 122, electromagnetic directional control valve 300 disposed in third communication passage 123 to selectively open and close third communication passage 123, first check valve 211 disposed between first connection portion 131 and first oil passage 111 to allow working oil to flow in one direction from first oil passage 111 to first connection portion 131 only, second check valve 212 disposed between first connection portion 131 and second oil passage 112 to allow working oil to flow in one direction from second oil passage 112 to first connection portion 131 only, third check valve 213 disposed between second connection portion 132 and first oil passage 111 to allow working oil to flow in one direction from second connection portion 132 to first oil passage 111 only and fourth check valve 214 disposed between second connection portion 132 and second oil passage 112 to allow working oil to flow in one direction from second connection portion 132 to second oil passage 112 only.

By this, at the time of manual steering without any steering assist force, the working oil pressurized in second oil pressure chamber 82 is supplied to first oil pressure chamber 81, thus attaining movement of working oil between first and second oil pressure chambers 81, 82 without causing first oil pressure chamber 81 to tend to create a vacuum or negative pressure and without supply of any working oil from reservoir 100. This enables the flow of working oil between first and second oil pressure chambers 81, 82 to be smooth, thus making it possible to improve the followability of working oil to the steering operation by the driver and attain movement of rack shaft 40 in the x-axis positive direction without putting an excessively large steering load on the driver.

The entire contents of Japanese Patent Applications P2004-264575 (filed Sep. 10, 2004) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A power steering system comprising: a hydraulic power cylinder for applying a steering assist force to a steering mechanism, the power cylinder having a piston and first and second oil pressure chambers divided by the piston; a reversible pump having a pair of discharge ports; a first oil passage connecting the first oil pressure chamber to one of the discharge ports; a second oil passage connecting the second oil pressure chamber to the other of the discharge ports; an electric motor for driving the reversible pump in forward and reverse directions; a steering assist force detector for detecting a steering assist force to be applied to the steering mechanism; an electric motor control circuit for outputting to the electric motor a drive signal that causes the reversible pump to produce a desired oil pressure on the basis of the steering assist force; a first communication passage interconnecting the first oil passage and the second oil passage; a second communication passage interconnecting the first oil passage and the second oil passage; a third communication passage interconnecting the first communication passage and the second communication passage; an electromagnetic directional control valve disposed in the third communication passage to selectively open and close the third communication passage; a first check valve disposed in the first communication passage at a location between a first connection portion and the first oil passage for allowing working oil to flow in one direction from the first oil passage to the first connection portion only, the first connection portion being a portion at which the first communication passage and the third communication passage are connected; a second check valve disposed in the first communication passage at a location between the first connection portion and the second oil passage for allowing working oil to flow in one direction from second oil passage to the first connection portion only; a third check valve disposed in the second communication passage at a location between a second connection portion and the first oil passage for allowing working oil to flow in one direction from the second connection portion to the first oil passage only, the second connection portion being a portion at which the second communication passage and the third communication passage are connected; and a fourth check valve disposed in the second communication passage at a location between the second connection portion and the second oil passage for allowing working oil to flow in one direction from the second connection portion to the second oil passage only.

2. A power steering system according to claim 1, wherein the electromagnetic directional control valve puts the third communication passage into an open condition when an abnormality of the power steering system is detected.

3. A power steering system according to claim 2, wherein the electromagnetic directional control valve puts the third communication passage into a closed condition when energized and into an open condition when de-energized.

4. A power steering system according to claim 1, wherein the electromagnetic directional control valve includes a solenoid section and a valve section, the valve section including a poppet valve member.

5. A power steering system according to claim 4, wherein the poppet valve member is urged in the direction to obstruct communication between the first communication passage and the third communication passage by an oil pressure present in a portion of the first communication passage between the first and second check valves.

6. A power steering system according to claim 1, wherein the electromagnetic directional control valve further includes: a valve housing having an axial hole in communication with the first communication passage and the third communication passage; a solenoid provided to the valve housing; a first poppet valve member axially movably disposed in the axial hole of the valve housing and operatively connected to the solenoid so as to be driven in a predetermined axial direction when the solenoid is energized; a second poppet valve member axially movably disposed in the axial hole of the valve housing and having a seat portion for abutting engagement with the first poppet valve member, an axial through hole that is selectively opened and closed by the first poppet valve member and a pressure receiving portion for receiving a pressure in the first communication passage, the second poppet valve member being axially driven by the first poppet valve member to obstruct communication between the first communication passage and the third communication passage when the solenoid is energized; a first spring member for urging the first poppet valve member in the direction to open the axial through hole of the second poppet valve member; and a second spring member for urging the second poppet valve member in the direction to provide communication between the first communication passage and the third communication passage.

7. A power steering system according to claim 6, wherein the axial through hole of the second poppet valve member includes a restricted hole section.

8. A power steering system according to claim 1, further comprising: a reservoir storing working oil; a first suction passage connecting the reservoir to the first oil passage; a check valve disposed in the first suction passage for allowing working oil to flow in one direction from the reservoir to the first oil passage only; a second suction passage connecting the reservoir to the second oil passage; and a check valve disposed in the second suction passage for allowing working oil to flow in one direction from the reservoir to the second oil passage only.

9. A power steering according to claim 8, wherein the first and the second suction passages are connected to the first and second oil passages at locations closer to the reversible pump than locations at which the first communication passage is connected to the first and second oil passages.

10. A power steering according to claim 1, wherein the first and second communication passages are arranged symmetrically with respect to a predetermined axis.

11. A power steering system comprising: a power cylinder for applying a steering assist force to a steering mechanism, the power cylinder having a piston and first and second oil pressure chambers divided by the piston; a reversible pump having a pair of discharge ports; a first oil passage connecting the first oil pressure chamber to one of the discharge ports; a second oil passage connecting the second oil pressure chamber to the other of the discharge ports; an electric motor for driving the reversible pump in forward and reverse directions; a steering assist force detector for detecting a steering assist force to be applied to the steering mechanism; an electric motor control circuit for outputting to the electric motor a drive signal that causes the reversible pump to produce a desired oil pressure on the basis of the steering assist force; a first communication passage interconnecting the first oil passage and the second oil passage; a second communication passage interconnecting the first oil passage and the second oil passage; a third communication passage interconnecting the first communication passage and the second communication passage; an electromagnetic directional control valve disposed in the third communication passage to put the third communication passage into an open condition at the time of an abnormality of the power steering system; a first check valve disposed in the first communication passage at a location between a first connection portion and the first oil passage for allowing working oil to flow in one direction from the first oil passage to the first connection portion only, the first connection portion being a portion at which the first communication passage and the third communication passage are connected; a second check valve disposed in the first communication passage at a location between the first connection portion and the second oil passage for allowing working oil to flow in one direction from the second oil passage to the first connection portion only; a third check valve disposed in the second communication passage at a location between a second connection portion and the first oil passage for allowing working oil to flow in one direction from the second connection portion to the first oil passage only, the second connection portion being a portion at which the second communication passage and the third communication passage are connected; and a fourth check valve disposed in the second communication passage at a location between the second connection portion and the second oil passage for allowing working oil to flow in one direction from the second connection portion to the second oil passage only.

12. A power steering system according to claim 11, wherein the electromagnetic directional control valve includes a solenoid section and a valve section.

13. A power steering system according to claim 12, wherein the electromagnetic directional control valve further includes: a valve housing having an axial hole in communication with the first communication passage and the third communication passage; a solenoid provided to the valve housing; a first poppet valve member axially movably disposed in the axial hole of the valve housing and operatively connected to the solenoid so as to be driven in a predetermined axial direction when the solenoid is energized; a second poppet valve member axially movably disposed in the axial hole of the valve housing and having a seat portion for abutting engagement with the first poppet valve member, an axial through hole that is selectively opened and closed by the first poppet valve member and a pressure receiving portion for receiving a pressure in the first communication passage, the second poppet valve member being axially driven by the first poppet valve member to obstruct communication between the first communication passage and the third communication passage when the solenoid is energized; a first spring member for urging the first poppet valve member in the direction to open the axial through hole of the second poppet valve member; and a second spring member for urging the second poppet valve member in the direction to provide communication between the first communication passage and the third communication passage.

14. A power steering system according to claim 13, wherein the axial through hole of the second poppet valve member includes a restricted hole section.

15. A power steering system according to claim 12, wherein the poppet valve member is urged in the direction to obstruct communication between the first communication passage and the third communication passage by an oil pressure present in a portion of the first communication passage between the first and second check valves.

16. A power steering system according to claim 11, further comprising: a reservoir storing working oil; a first suction passage connecting the reservoir to the first oil passage; a check valve disposed in the first suction passage for allowing working oil to flow in one direction from the reservoir to the first oil passage only; a second suction passage connecting the reservoir to the second oil passage; and a check valve disposed in the second suction passage for allowing working oil to flow in one direction from the reservoir to the second oil passage only.

* * * * *